Feb. 19, 1957 B. E. HOUSE 2,781,868
BRAKE ASSEMBLY
Filed March 4, 1955
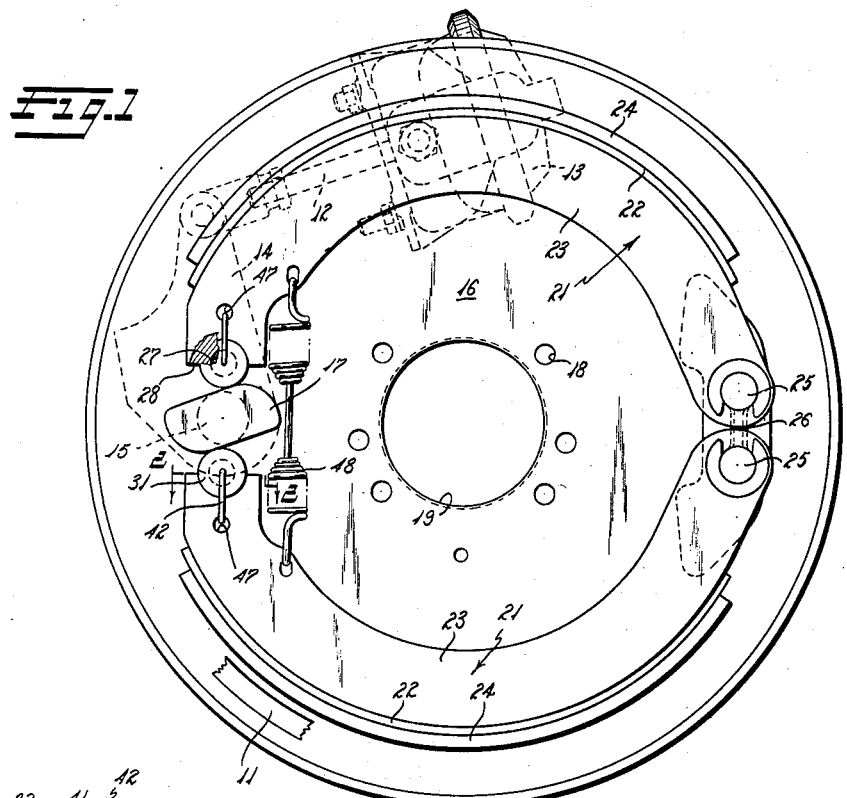
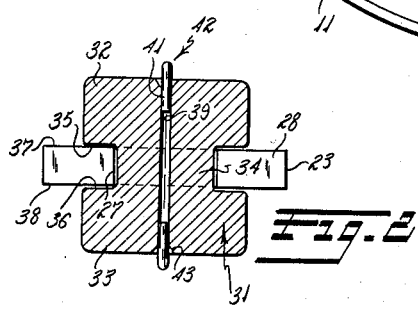
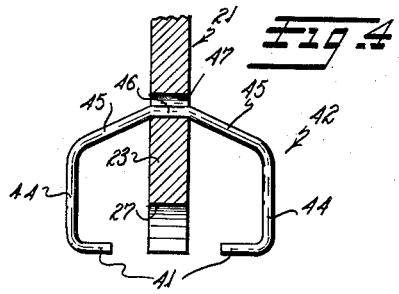
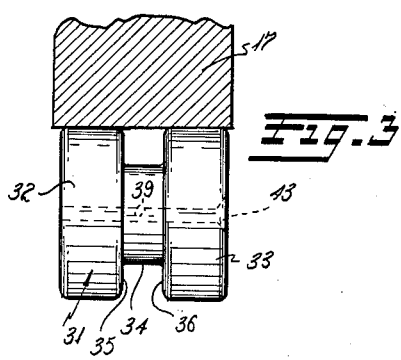
INVENTOR
BRYAN E. HOUSE
BY Strauch, Nolan & Diggins
ATTORNEYS United States Patent Office 2,781,868
Patented Feb. 19, 1957

2,781,868

BRAKE ASSEMBLY

Bryan E. House, Ashtabula, Ohio, assignor to Rockwell Spring and Axle Company, Coraopolis, Pa., a corporation of Pennsylvania Application March 4, 1955, Serial No. 492,075

8 Claims. (Cl. 188—78)

This invention relates to improvements in vehicle brakes and has particular reference to cam follower rollers and roller retaining spring arrangements in cam actuated power brakes.

Vehicle brakes with externally mounted power motors, camshafts and actuating cams require effective means for transforming the torque input to the actuating cams into thrust for the brake shoes. This has sometimes been accomplished in the past by means of brake shoe mounted follower rollers which engage the actuating cam and are usually maintained in surface contact with the cam by return springs. These cam follower rollers in the past have been rotatably mounted on pivot pins fixed to the brake shoe web. It has been found that when roller rotation is impeded or stopped as by dirt, corrosion or a misaligned pivot axis a flat usually forms on the roller which increases in size as the roller is slid along instead of rolled with respect to the actuating cam surface. This results in increased friction, accelerated wear and soon uneven brake actuation.

The present invention is concerned essentially with a manner of mounting each cam follower roller on the end of the brake shoe web in such fashion that misalignment and binding of the roller are minimized, and more specifically it provides a straddle mounted roller spring retained in an end socket in the shoe web.

It is the major object of my invention to provide a brake assembly wherein the actuating cam and the cam follower rollers on the brake shoes have novel association for minimizing mutual wear.

A further object of the invention is to provide a novel mounting for a brake cam follower roller on a brake shoe web.

A further object of the invention is to provide a novel brake cam follower roller mounting in an open socket on a brake shoe web edge.

Another object of the invention is to provide a novel brake shoe assembly wherein a spool type brake cam follower roller rocks on a socket in the shoe web for improved alignment, operational and wear characteristics.

A further object of the invention is to provide a novel single web brake shoe having at one end of the web a saddle mounting socket for a cam follower roller.

A further object of the invention is to provide a novel manner of mounting a cam follower roller on a brake shoe web wherein the roller is journalled intermediate its ends in an open ended web edge socket and retained thereby a special spring arrangement that permits free rolling and limited lateral rocking of the roller.

Further objects of the invention will become apparent as the invention proceeds in connection with the appended claims and the annexed drawings wherein:

Figure 1 is an end view of a two shoe internally expanding brake assembly showing the cam actuator and cam follower roller association according to a preferred embodiment of the invention;

Figure 2 is a sectional view substantially on line 2—2 of Figure 1 showing the web and socket and the spring connection to the roller;

Figure 3 is a side elevation of the spool type cam follower roller also showing its contact with the cam; and Figure 4 illustrates the roller retaining spring detail as associated with the shoe web.

Figure 1 illustrates a two shoe internally expanding brake assembly disposed within a cylindrical drum 11. Output shaft 12 of an air or vacuum powered motor 13 is operatively connected to a slack adjuster or like lever 14 which is non-rotatably secured to the brake camshaft 15. Camshaft 15 extends through the brake mechanism mounting or backing plate 16 and has an integral actuating cam 17 on its inner end. The working faces of cam 17 are parallel to the axis of shaft 15. Backing plate 16 is rigidly mounted on the axle housing as by rivets passing through rivet openings 18 surrounding central opening 19.

The brake assembly comprises two similar and interchangeable brake shoes 21. Each brake shoe is of generally T-shape in cross section and has an arcuate platform 22 rigid with a central narrow web 23. The usual brake lining material 24 is secured on platform 22. Brake shoes 21 are individually pivotally mounted upon adjacent anchor pins 25 rigidly projecting from a bracket 26 secured interiorly to plate 16.

At the other end each brake shoe web 23 is formed with a semi-circular open ended socket 27 recessed below the flat straight edge surface 28. A cam follower 31 (Figures 2 and 3) is mounted on the shoe web in each such socket 27. This follower is a spool shaped roller consisting of cylindrical side roller sections 32 and 33 of the same size interconnected concentrically by a reduced diameter cylindrical center section 34. The diameter of section 34 is slightly less than that of the socket 27 and the axial length of section 34 is slightly greater than the width of socket 27 so that in the assembly as shown in Figure 2 the parallel inner flat roller sides 35 and 36 have ample running clearance with the opposite flat parallel sides 37 and 38 of web 23. The cylindrical surfaces of roller sections 32 and 33 are hardened and normally in full surface contact with cam 17 as shown in Figure 3. The foregoing mounting of roller 31 in socket 27 permits any slight cocking of the roller axis which may be necessary to assume full surface contact with the cam so that misalignment is automatically compensated and the cam thrust to both rollers 31 is evenly distributed over a maximum pressure area.

Each roller 31 is provided with a central bore 39 to rotatably receive the axially aligned inwardly directed ends 41 of a generally U-shaped wire retaining spring 42. At least one end of bore 39 is chamfered at 43 to facilitate assembly. Spring 42 is provided with parallel side portions 44 of equal length which extend from ends 41 to similar angularly inwardly extending portions 45. Portions 44 are of sufficient length to insure that the inwardly angularly extending wire spring portions 45 clear the respective roller spool end sections 32 and 33. A bridge portion 46 parallel to ends 41 joins spring portions 45 and passes through a shoe web opening 47 provided in web 23 spaced from socket 27. As shown in Figure 1 in the assembly spring 42 pulls roller 31 into its seating engagement with socket 27 along a line that extends through the centers of roller 31 and camshaft 15.

The brake shoes 21 are interconnected adjacent the cam 17 by a tension type return spring 48 which urges the shoes into retracted position and maintains the cam rollers 31 tightly against the cam surfaces.

I have thereby provided a cam follower roller arrangement wherein the rollers are freely rotatably mounted on the ends of the shoe webs and automatically compensatively rocked to correct slight misalignments for full surface cam contact. The open ended sockets and freely rotatable rollers result in a combination wherein there is no binding of the rollers due to dirt build up in the socket.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is to be claimed and desired to be secured by United States Letters Patent is:

1. In an internally expanding brake, a support, two brake shoe assemblies pivoted at adjacent ends on said support, a rotatable actuator cam on said support disposed between the other ends of said shoes, means providing open-ended cam roller bearing sockets on said other ends of said shoes facing said cam, cam follower rollers on said other ends of said shoes freely rotatably and laterally rockably mounted in said sockets for full surface engagement with said cam, a retainer spring extending between each shoe and associated roller for retaining the rollers on the shoes but permitting said rotation and rocking movement during normal operation, and return spring means urging both shoes toward each other for providing operational engagement between said cam and said shoes.

2. In an internally expanding brake, a support, two brake shoes pivoted at adjacent ends on said support, each of said brake shoes comprising a lining mounting platform and a web structure, each of said web structure having open ended and open sided sockets facing each other at the other ends of said webs, rollers rotatably seated in said sockets, a retainer spring extending between each web structure and its associated roller for retaining the rollers in their sockets but permitting free rotation thereof, a cam rotatable about a fixed axis on said support between said other ends of said brake shoes, and return spring means separate from said retainer springs urging said shoes toward each other and said rollers against said cam.

3. In an internally expanding brake for association with a rotatable drum, a support, two single web brake shoes having linings for frictional engagement with said drum, shoe return spring means, shoe anchor pins on the support individually pivotally mounting adjacent ends of each said shoe, an actuating cam rotatable about a fixed axis, spool type cam rollers rockably mounted on the other end of each said shoe and retainer springs each extending through a shoe web and rotatably connected to each end of the respective rollers.

4. In the internally expanding brake defined in claim 3, each said roller being formed with end roller portions and a reduced diameter roller portion intermediate said end portions and coaxial openings at each end to receive the ends of said retainer spring.

5. In the internally expanding brake defined in claim 3, an open ended saddle type seat in the cam end of each said shoe web, and said rollers having reduced diameter portions rockably rotationally seated in said seats with said end roller portions extending over adjacent sides of the respective shoe web in such spaced relation as to permit limited rocking of said rollers in said seats.

6. In a brake assembly, a pivoted brake shoe having a web, means providing an open ended socket recess in an end of said web, a cam follower comprising spaced roller portions of the same diameter connected by a reduced diameter central portion mounted on said web with said reduced diameter portion seated in said socket and the inner sides of said roller portions extending along the adjacent sides of said web, a retainer on said web operatively connected to said cam follower for maintaining the cam follower seated in said socket while permitting free rotation thereof about its axis, and a cam rotatable about a fixed axis on said support disposed in operative contact with said roller portion surfaces.

7. In the brake assembly defined in claim 6, said web having an opening near said socket and said retainer being a substantially U-shaped spring having its bridge in said opening and its ends inturned into coaxial bores in said cam follower.

8. In a brake assembly defined in claim 6, said reduced diameter portion of the cam follower being slightly axially longer than the socket width so that the cam follower is capable of limited rocking in its seat to present full roller surface contact to said cam.

References Cited in the file of this patent

UNITED STATES PATENTS

| | | |
|---|---|---|
| 1,756,996 | Sanford | May 6, 1930 |
| 2,161,899 | Main | June 13, 1939 |
| 2,592,536 | Buchendale | Apr. 15, 1952 |